June 6, 1961  B. KIRSTEN  2,987,032
COMBINED KNOB AND DIAL
Filed Nov. 8, 1957

INVENTOR.
BERNDT KIRSTEN

United States Patent Office 2,987,032
Patented June 6, 1961

2,987,032
COMBINED KNOB AND DIAL
Berndt Kirsten, 3920 W. 6th St., Los Angeles 5, Calif.
Filed Nov. 8, 1957, Ser. No. 695,344
15 Claims. (Cl. 116—124)

This invention relates to tuning knobs for indicating and controlling electronic and mechanical instruments and components and more particularly to front face knobs which are integral with and contain the dial and indicator therefor.

Means for illuminating the dial and indicator to provide maximum readability is also provided, thus eliminating the use of expensive internally illuminated panels. This invention relates to improvements in tuning knobs of the type disclosed in my United States Patent 2,819,-698 entitled "Combined Knob and Dial." Several features of the present invention can be advantageously used on knobs disclosed in the hereinabove mentioned application.

Knobs of the prior art used for turning or otherwise controlling or setting values on a dial of radio receivers, broadcasting equipment and other electronic or mechanical equipment are of small diameter and usually include a projecting pointer or a series of gradations to give a visual indication.

It is often necessary to conserve space on an instrument panel which purpose is not served by the above described prior art knobs.

Many of the prior art knobs used on electronic equipment have their dials mounted or engraved on the panel upon which the knob is mounted. These dials, thus being exposed, are subject to wear with the passage of time due to dust and moisture in the ambient.

It is often required that the angular excursion of a knob not exceed certain prescribed limits. This requirement is often imposed on knobs which are used to tune certain types of potentiometers, variable capacitors or other electronic circuit components.

It is therefore an object of the present invention to provide a front face combined knob and dial which includes therein a dial and pointer for easy vision and sensitive tuning.

Another object of the present invention is to provide a combined knob and dial which encloses an integral dial thus protecting the latter from the ambient.

A further object of the present invention is to conserve space on an instrument panel by providing an improved type knob and dial combinations.

A still further object of the present invention is to provide a dial and knob combination of novel construction which limits the angular rotation of a shaft to which it is connected within a predetermined or adjustable range.

According to the presently preferred embodiment of this invention there is provided a knob enclosing an indicia bearing dial over which an indicator or pointer may play to indicate the position of a shaft which may be fixedly inserted within the knob.

The novel features which are believed to be characteristic of the invention, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

Figure 1:
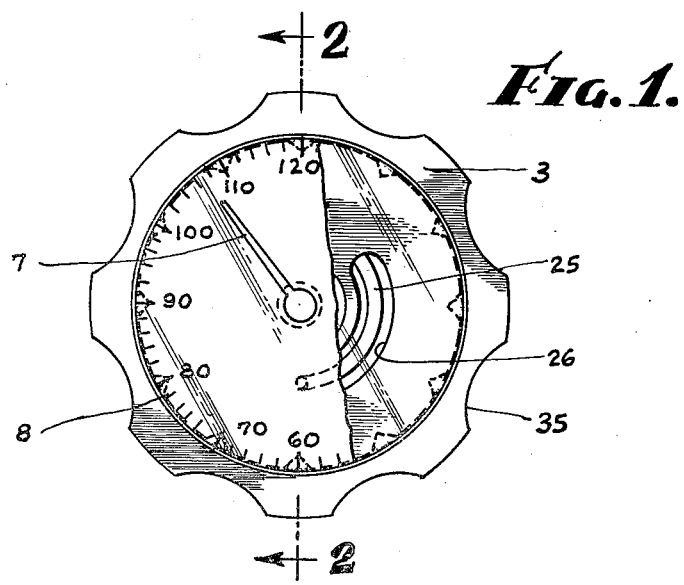
FIGURE 1 is a front elevation, partly in section of a combined knob and dial in accordance with the present invention.
Figure 2:
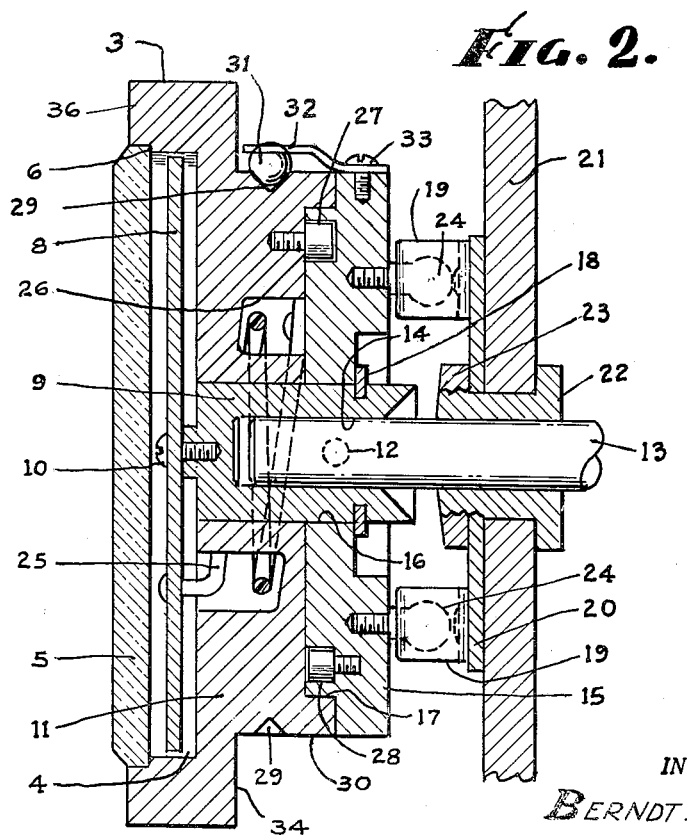
FIGURE 2 is an enlarged sectional view taken along line 2—2 of FIGURE 1.

Referring now to the drawing and particularly to FIGURES 1 and 2, there is shown a manually rotatable knob 3 which may be made of metal or plastic or any other suitable material. In FIGURE 2 the knob 3 is shown to be mounted upon an instrument panel 21 behind which an element, not shown, to be controlled may be housed. The knob 3 is coupled to an element by shaft 13 which is secured within center hole 16 in the center of bearing 9 by means of set screw 12. In order to facilitate manual rotation, the peripheral surface of knob 3 may be formed with spaced flutes or corrugations 35 as shown in FIGURE 1.

The knob 1 further has a cylindrical body portion 11 which may preferably be stepped down at shoulder 34, if desired, to produce a larger viewing front. The outer facing wall 36 of the knob has a circular recess 4 therein to accommodate dial 8, and transparent cover member 5. Said member 5 is press fitted within shoulder 6 to form a tight seal to keep the dial mechanism within the knob free of dust and other elements in the ambient, such as moisture and the like.

Dial 8, which may be a painted or engraved transparent plate or the like, is mounted upon bearing 9 by means of screw 10. A pointer 7 is secured within the knob and turns with the same velocity as the knob. Shaft 13 may be an extension integral with or selectively coupled to any electronic component or the like whose setting or control depends upon the rotation of a shaft. Back plate 15, which has a central hole 16 to receive bearing 9 therein, is placed against the rear of the body portion 11 of knob 3 within circular back recess 17. Snap ring 18 holds back plate 15 in position against the rear of body portion 11 of knob 3. A circular back recess 17 is provided in the knob of FIGURES 1 and 2 to better position back plate 15.

In the FIGURES 1 and 2 embodiment of the present invention a spring clip arrangement is employed in order to determine the initial angular position of the dial 8. One or more spring clips 19 are mounted upon bracket adjustment plate 20, which may be connected to instrument panel 21 by fitting 22 which has a nut threaded on fitting 22 to permit adjustment of the clips 19. Ball plugs 41 are threadably fastened to back plate or ring 15, thus permitting any arbitrary angular position of back plate 15 to be determined by positioning of plate 20 as ball plug 41 are inserted within clips 19 after proper orientation of plate 20. The back plate 15 is coupled to dial 8 by means of coil connection 25. The coil 25 is disposed within spiral cutout section 26 within body portion 11 of knob 3 to hold the dial stationary. Stop pins 27 and 28 being mounted within the back of portion 11 and front of back plate 15, respectively, will serve to limit the angular rotation of the knob when the two beads thereof come into contact with each other upon a complete revolution of the knob. Detent action can be added as a feature to this embodiment by providing a series of holes 29 about the periphery of the surface 30 of body portion 11. Detent ball 27 is carried by clip 32 which is fastened to back plate 15 by means of screws 33.

There has thus been described a new and improved knob and dial assembly which may be adapted to control a turnable device within a prescribed angular range in which the knob and dial are integral, the dial being disposed within the knob.

I claim as my invention:

1. A combined knob and dial assembly for controlling a shaft of an adjustable device mounted on a support, said assembly comprising: a combined knob and dial; means for rigidly attaching said knob to said shaft for transmitting rotation thereto; a dial assembly coaxially supported within said knob and means for connecting said dial assembly to a supporting structure, said connecting means comprising a coil, said assembly further including means for mounting the rear end of said coil to said supporting structure, and a dial anchored to the other end of said coil, said knob forming a helical angular recess receiving the turns of said coil, said recess having one circumferential portion thereof open at the forward end of said knob, and another circumferential portion thereof open at the rear end of said knob, whereby said dial concentrically disposed forwardly within said knob and whereby said knob may be rotated while the rear end of said coil remains attached to said supporting structure to hold the dial stationary.

2. In a combined knob and dial assembly for controlling a shaft of an adjustable device mounted on a supporting structure, said assembly comprising: a knob, means for rigidly attaching said knob to said shaft for transmitting rotation thereto; a dial and an indicator within said knob and means for anchoring said dial to a supporting structure, said anchoring means including a coil; a coil for stationary supporting said dial, an indicator associated with said dial to indicate the position of rotation of said knob and adjustable device when said knob is rotated, whereby said anchoring means hold said dial stationary.

3. In a combined knob and dial assembly for turning a shaft rotatably mounted on a supporting structure comprising: means for mounting said knob to said shaft, said knob having a forward and a backward circumferential portion open at both ends, a back plate coaxially mounted to the rear end of said knob closing said opening, a dial assembly within the forward portion of said knob; and means within said knob connecting said dial assembly to said back plate, a supporting member mounted to the exterior surface of said back plate; means for engaging said supporting member adjacent to said supporting structure for stationary supporting said back plate to hold said dial stationary when said knob is rotated.

4. In a combined knob and dial assembly for turning a shaft rotatably mounted on a supporting structure, said assembly comprising: a knob having an opening to receive a shaft; means within said opening for coaxially connecting said knob to said shaft, said knob having a forward and a backward circumferential portion open at both ends; means within said open portion thereof for communicating between said first and second opening, a back plate coaxially mounted to the rear end of said knob and means for engaging said back plate thereto, a dial assembly within said knob and means for mounting a part of said dial assembly to said back plate, and means for rigidly attaching said back plate to a supporting structure to hold said dial stationary during rotation of said knob.

5. A combined knob and dial assembly as defined in claim 4 wherein said connection means between said knob and said back plate includes means for limiting the maximum angular excursion of said knob relative to said back plate within predetermined angular limits.

6. A combined knob and dial assembly as defined in claim 4 wherein said dial assembly comprising a dial concentrically disposed within said knob; said dial having indicia for cooperative association with an indicator carried by said knob.

7. A combined knob and dial assembly as defined in claim 4 including means for connecting said back plate to said knob for limiting the maximum angular excursion of said knob relative to said dial, stop means; said stop means including a first and second stop member; said first member is coupled to said back plate and said second member is coupled to said knob for selectively angularly positioning said knob relative to said dial.

8. A combined knob and dial assembly as defined in claim 4 wherein said back plate forming a circular channel on the face thereof, adjacent to said face of said knob, said circular channel is concentric with the axis of said knob, a coil rigidly attached to said back plate, said coil having the same turns as said circumferential portion within said knob.

9. A combined knob and dial assembly as defined in claim 4 including index means for setting the fixed angular position of said knob relative to said supporting structure, a series of cavities about the periphery of said knob, said cavities cooperating with a ball for indexing knob rotation.

10. A combined knob and dial assembly as defined in claim 4, said dial assembly is protected from dust and moisture at the forward face thereof by transparent means and at the opposite side thereof by a back plate.

11. A combined knob and dial assembly for controlling a shaft of an adjustable device mounted to a support, said assembly comprising: a substantially flat back plate having a projecting circular surface on one face thereof; a shaft projecting from both surfaces of said back plate, the surface of said back plate opposing said projecting circular surface adapted for rigid attachment to the supporting structure, a cylindrically shaped knob forming a first recess into one end thereof and substantially equal in diameter to said projecting circular surface, said knob having a central opening into one end thereof to receive a shaft to be rigidly connected thereto, said knob forming a second recess into the other end thereof, a dial assembly within said knob, and means between said dial assembly and said projecting circular surface to indicate the angular position of said knob relative to said supporting structure.

12. In a combined knob and dial assembly for indicating the angular position of a shaft, said assembly including: a knob; means for rigidly attaching said knob to said shaft; said knob having a circular portion open at both ends and means for communicating with both circular portions, a dial assembly coaxially supported within the front portion of said knob, a back plate mounted on the other end of said knob, allowing said knob to move freely within fixed limits while said back plate is connected to a supporting structure, and means within said knob for holding said dial stationary.

13. In a combined knob and dial assembly as defined in claim 12 wherein said fixed limits including stop means; one of them mounted to the rear end of said knob, and the other one to the front end of said back plate, respectively, to serve to limit the angular rotation of said knob when the two stop means come in contact with each other.

14. In a combined knob and dial assembly as defined in claim 11 wherein said dial assembly included a dial member coaxially mounted within said knob and transparent means to cover said dial; said transparent means further including a pointer, said pointer rotates with said knob to give indication of the angular position of said knob and shaft.

15. In a combined knob and dial assembly as defined in claim 11 wherein said knob assembly further includes a plurality of ball plugs, said ball plugs mounted on the rear end of the back plate to be inserted within the clips when said knob is mounted to said shaft, said clips and said ball plugs holding said dial assembly stationary during the rotation of said knob.

References Cited in the file of this patent

UNITED STATES PATENTS

| | | |
|---|---|---|
| 2,104,520 | Jackson | Jan. 4, 1938 |
| 2,278,520 | Klein | Apr. 7, 1942 |
| 2,767,681 | Pontius | Oct. 23, 1956 |